April 11, 1944.                  B. LEVY                    2,346,315
                    FIXTURE FOR FLUORESCENT TUBES
                         Filed May 2, 1942
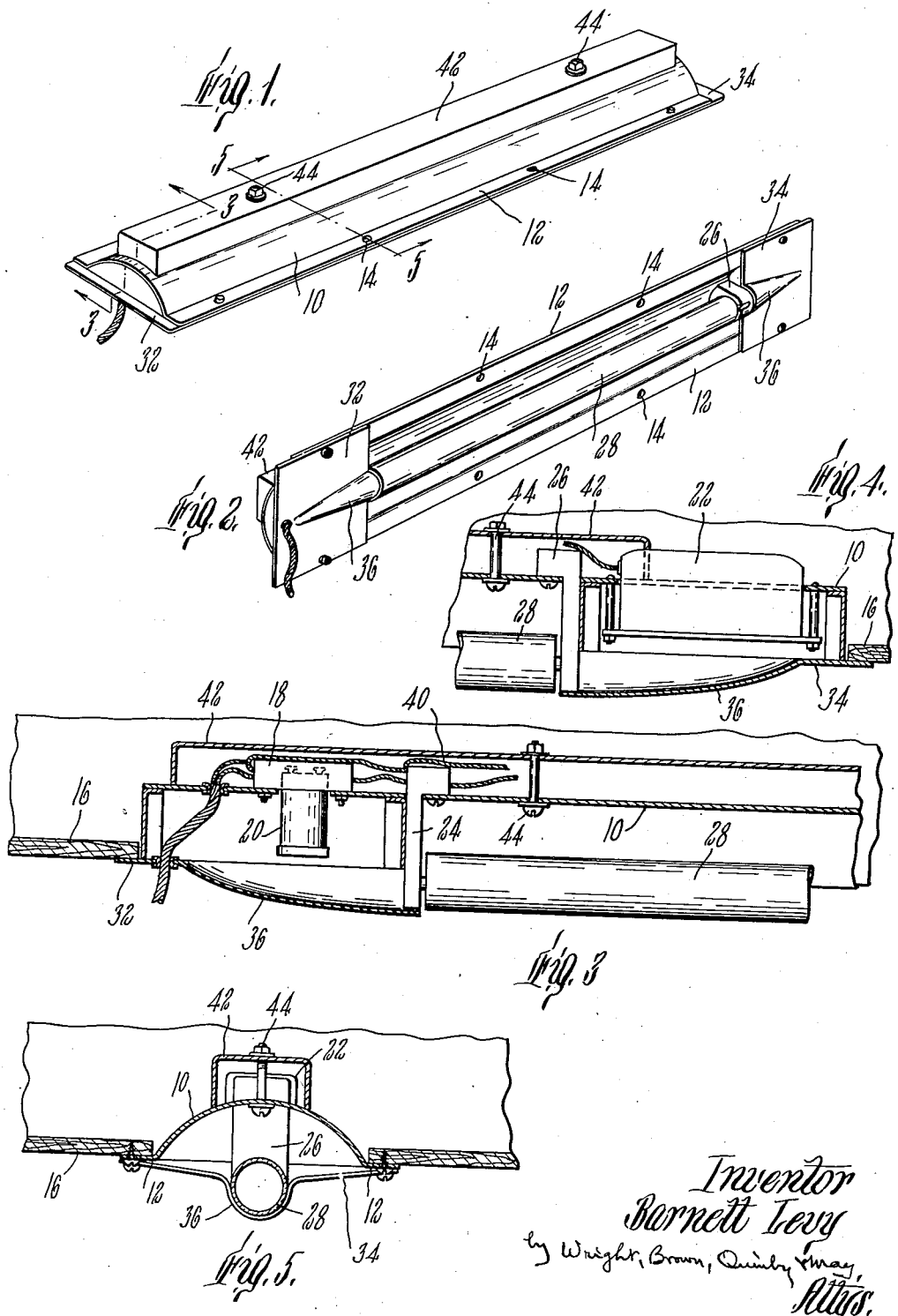

Patented Apr. 11, 1944

2,346,315

UNITED STATES PATENT OFFICE 2,346,315

FIXTURE FOR FLUORESCENT TUBES

Barnett Levy, Brookline, Mass., assignor to A. L. Smith Iron Co., Chelsea, Mass., a corporation of Massachusetts Application May 2, 1942, Serial No. 441,437

4 Claims. (Cl. 240—7.35)

This invention relates to a fixture or trough for one or more fluorescent tubes which is designed to be mounted substantially flush with the ceiling or wall which supports it.

An object of the invention is to provide a fixture with means for protecting the support brackets for the tube, so that when the fixture is installed in a comparatively low ceiling (for example, in a cabin trailer), the brackets will not be subject to accidental collision with some person's head. Another object of the invention is to provide ventilation for the transformer or "ballast" customarily employed to step-up the input voltage. A further object of the invention is to provide a fixture or trough which is relatively shallow so that it takes up minimum space and is economical to manufacture.

Various other advantageous features of the invention may be apparent to one skilled in the art from the disclosure of the invention in the following description thereof, and in the drawing of which Figure 1 is a perspective top view of a fixture embodying the invention.

Figure 2 is a perspective bottom view of the same.

Figure 3 is a section on the line 3—3 of Figure 1.

Figure 4 is a fragmentary longitudinal sectional view of a modified form of the invention.

Figure 5 is a section on the line 5—5 of Figure 1.

The invention, as illustrated on the drawing, may be embodied in an inverted trough 10 of metal, molded plastic or other suitable material, which is preferably but not necessarily of cylindrically concaved shape with longitudinal edge flanges 12 having suitable screw holes 14 for screws by which the fixture can be secured to a ceiling 16. It is to be understood that while the fixture is herein described and illustrated as mounted in a ceiling, it can also be mounted in a side wall or other support. As indicated in Figure 5, the fixture is adapted to be inserted in an opening in the ceiling or supporting wall so as to be sunk therein substantially flush. In order to avoid undue vertical height of the fixture and to economize in construction material, the inverted trough 10 is made comparatively shallow. Thus the fixture can be accommodated in a ceiling having a relatively small air space between it and the roof as in cabin trailers. Near one end of the trough 10 is mounted a starting unit for the fluorescent tube. This comprises a fixed base member 18 which is secured upon the bottom of the inverted trough 10 and a detachable cylindrical member 20 which projects through an aperture in the bottom of the trough 10 to engage detachably the base-member 18. Adjacent to the other end of the trough is a suitable transformer 22, usually referred to as the "ballast." This is secured in the trough and projects up through an aperture in the bottom of the trough so that it extends above as indicated in Figure 4. Between the starting unit and the transformer are a pair of suitable brackets 24 and 26 which are mounted in the trough so as to project downward therefrom and are spaced to receive between their lower extremities a fluorescent tube 28. These extremities of the brackets project below the plane of the side flanges or margins 12 of the trough sufficiently to hold the tube mainly below or outside of the trough, and have cylindrically curved contours substantially conforming and flush with the under side of the tube. By virtue of this arrangement, the tube is enabled to illuminate the compartment in which the unit is installed with little or no obstruction of light rays by the margins of the trough. But at the same time, when the fixture is mounted in a low ceiling, as is usually found in cabin trailers, there is danger that the projecting portions of the brackets may be struck by the head of an occupant of the cabin trailer with probable injury both to the bracket and to the head. To guard against such accidental injuries a pair of plates 32 and 34 are secured to the end portions of the trough 10, these plates serving to cover and conceal the starting unit and the transformer. The plates 32 and 34 are substantially flush with the ceiling 16 but each of these plates is formed with a suitable embossment 36 pressed from the plane of the plate into the shape of a guard member for the adjacent bracket 24 or 26. As shown in the drawing, the embossment 36 may have the approximate shape of a longitudinally split cone or torpedo head, curved at the deep end to embrace closely the extremity of the adjacent bracket and gradually diminishing in depth and radius of curvature away from that end; the embossments thus being inclined from the plane of the plates 32 and 34 to the lower extremities of the respective adjacent brackets. The portions of the plates 32 and 34 on either side of the embossments 36 may be slightly inclined as indicated in Figure 5, the angle of inclination decreasing progressively toward the outer end of each plate. These embossments thus offer smooth guard members to divert the head away from the brackets. The starting unit and transformer are connected to the brackets and to each other by suitable electric wiring generally indicated at 40. This wiring lies upon the bottom of the inverted trough 10 and must be suitably protected. To this end a housing member 42 is provided to rest upon the trough 10 and cover the wiring. A pair of bolts 44 may be provided to hold the housing member in place. This housing member may enclose the upwardly projecting portions of the starting unit and the transformer, as indicated in Figure 1, or may extend just beyond the inner end of the transformer, as indicated in Figure 4, to enclose all of the wiring but to leave practically all of the projecting portion of the transformer exposed. The latter arrangement promotes ventilation and cooling of the transformer which is liable to become quite hot after considerable use if too closely confined.

It is evident that various modifications and changes may be made in the embodiments of the invention shown and described without departing from the spirit or scope thereof as defined in the following claims.

I claim:

1. A lighting fixture comprising a reflector made as an elongated, cylindrically concave member adapted to be sunk into a ceiling with its lateral margins substantially flush with such ceiling, a pair of brackets mounted within said member and protruding at their outer extremities beyond the plane of said margins, said brackets being spaced apart sufficiently to receive a fluorescent tube between their extremities, and such extremities having curved contours in substantial conformity with the contiguous ends of such a tube when the tube is operatively mounted between them, and substantially plane cover plates secured to the margins of the reflector at the respective ends thereof, each cover plate extending from one end of the reflector to the adjacent bracket and having an outwardly offset embossment in its median portion, such embossment being shaped to embrace closely the extremity of the contiguous bracket and being of progressively diminishing width and depth from such end toward the outer margin of the plate.

2. A ceiling fixture for a fluorescent tube, comprising a reflector consisting of an elongated, cylindrically concave member adapted to be sunk in a ceiling with its lateral margins substantially flush with such ceiling, a pair of brackets mounted in said member and protruding outwardly beyond the plane of said lateral margins, spaced apart to receive a fluorescent tube between their protruding extremities, such extremities having contours curved in substantial conformity with the transverse curvature of such a tube, and an end plate adjacent to each said bracket secured to the margins of the reflector across the concavity thereof and extending from the adjacent bracket toward the nearer end of the tube, disposed so as to be substantially flush with the ceiling in which the reflector is mounted, each said end plate having a guard portion shaped to conform closely with the protruding extremity of the adjacent bracket, and extending thence with smoothly tapered contours to merger with the plane of the plate.

3. A ceiling fixture for fluorescent tubes, comprising an inverted trough adapted to be sunk substantially flush in a ceiling, a transformer mounted on said trough adjacent to an end thereof and projecting therethrough, a starting unit mounted on said trough adjacent to the other end thereof, a pair of brackets adapted to receive and support between them a fluorescent tube, said brackets being mounted in said trough between and respectively adjacent to said transformer and starting unit, electric wiring connecting said brackets, starting unit and transformer, a housing member mounted on the bottom of said inverted trough to enclose said wiring, and a pair of cover plates secured to the end portions of said trough adjacent to said brackets respectively and adapted to be substantially flush with said ceiling, said plates having portions to conceal the transformer and starting unit and to guard said brackets.

4. A ceiling fixture for fluorescent tubes, comprising an inverted trough having an aperture therethrough near an end thereof, spaced brackets in said trough adapted to receive a fluorescent tube, a transformer supported partly within said trough and projecting up through said aperture, wiring connecting said brackets and transformer, a housing mounted upon said trough enclosing said wiring and an end of the portion of the transformer projecting above said aperture but leaving most of said portion of the transformer exposed.

BARNETT LEVY.